Figure 1:
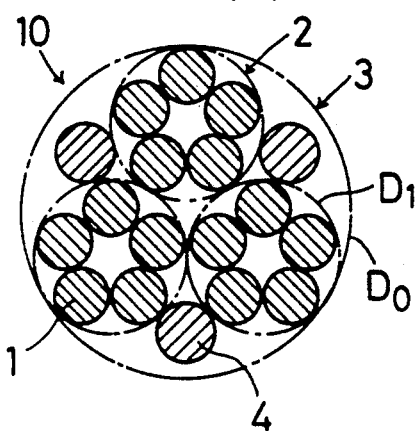

United States Patent [19]

Okamoto et al.

[11] Patent Number: 5,048,280
[45] Date of Patent: Sep. 17, 1991

[54] STEEL COMPOSITE CORD

[75] Inventors: Kenichi Okamoto; Hidekazu Nakata, both of Itami, Japan

[73] Assignee: Sumimoto Electric Industries, Ltd., Osaka, Japan

[21] Appl. No.: 456,755

[22] Filed: Dec. 26, 1989

[30] Foreign Application Priority Data

Dec. 27, 1988 [JP] Japan ................. 63-331032

[51] Int. Cl.$^5$ ............... D02G 3/02; D02G 3/36
[52] U.S. Cl. ................ 57/238; 57/218; 57/220; 57/222; 428/364; 428/373; 428/379; 428/376; 428/398
[58] Field of Search ........... 428/364, 373, 379, 376, 428/398; 57/218, 220, 222, 236, 238, 902

[56] References Cited

U.S. PATENT DOCUMENTS

| | | | |
|---|---|---|---|
| 339,646 | 4/1886 | Hallidie | 57/220 X |
| 2,241,955 | 5/1941 | Noyer et al. | 57/220 X |
| 2,261,070 | 10/1941 | Millard | 57/220 |
| 2,348,234 | 5/1944 | Warren, Jr. | 57/220 |
| 2,399,157 | 4/1946 | Warren, Jr. | 57/220 |
| 2,532,395 | 12/1950 | Dreyfus | 57/238 |

FOREIGN PATENT DOCUMENTS 1264118 2/1972 United Kingdom .

Primary Examiner—Lorraine T. Kendell
Attorney, Agent, or Firm—Armstrong, Nikaido, Marmelstein, Kubovcik & Murray

[57] ABSTRACT

A high-elongation composite cord used for reinforcing a rubber composite such as a wheel tire and a conveyor belt. It is made by twisting a plurality of strands each made by twisting a plurality of brass-plated steel filaments and monofilaments of organic fiber. Before twisting the cord, monofilaments of organic fiber are put in the gaps formed between the adjacent strands so as to prevent fluidized rubber from penetrating into a center core formed in the cord after the cord has been covered with rubber. The monofilaments should have a diameter small enough not to protrude from a circle circumscribing the cord and large enough to close the gaps between the adjacent strands.

4 Claims, 2 Drawing Sheets

3×5×d(A)

3×5×d(B)

STEEL COMPOSITE CORD

The present invention relates to a steel composite cord used for reinforcing a rubber composite such as a wheel tire and a conveyor belt and made by twisting a plurality of brass-plated steel filaments, and specifically to a steel composite cord having excellent elongation properties after being covered with rubber.

A steel cord is usually made from high-carbon steel wires having a carbon content of 0.65 to 0.85 per cent (JIS G 3502; piano wires) plated with brass alloy containing copper and zinc, drawn to a diameter of 0.1 to 0.4 mm, and a plurality of them twisted together into a single- or double-arrangement or into multi-layers. Such a steel cord is used as a reinforcing material for wheel tire and the like.

Such steel cords include a so-called high-elongation cord made by adopting cords constructions such as $2 \times 4 \times d$ (d: diameter of filament), $3 \times 3 \times d$, $3 \times 4 \times d$, $3 \times 7 \times d$ or $4 \times 4 \times d$. The strands are twisted in the same direction as the direction of twist of the steel wires and the lay length is limited to a minimum. As will be seen from FIG. 5, it exhibits a higher elongation under loaded conditions than any ordinary steel cord.

Another advantage of such a high-elongation cord is that it can be made easiy because the strands having the same characteristics are twisted.

Figure 6:
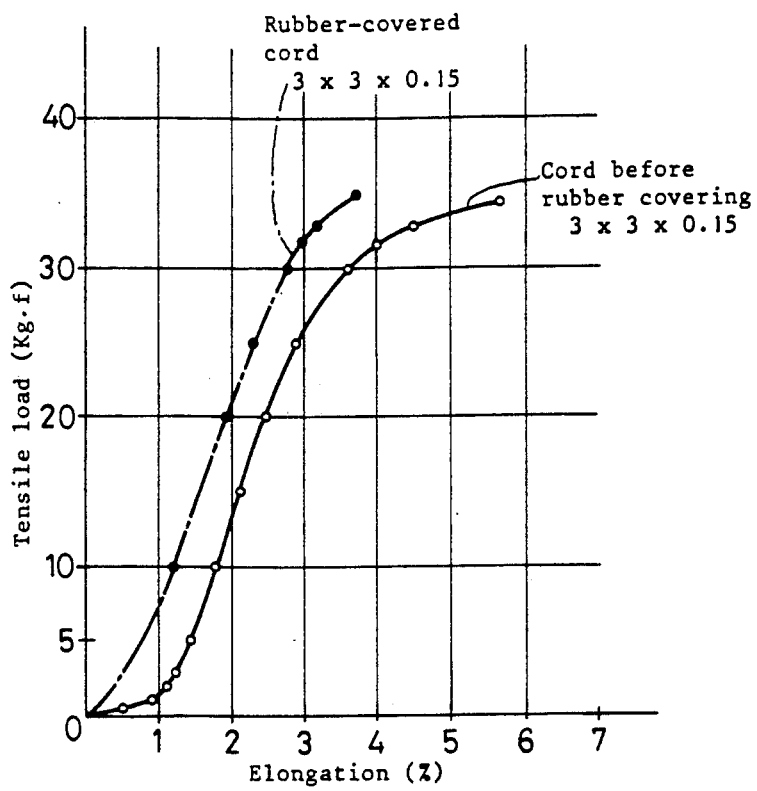

FIG. 6 shows the elongation properties of a prior art high-elongation cord having a $3 \times 3 \times 0.15$ (lay length 1.7S/3.5S) construction by way of example. The cord has an elongation of about 1 per cent under a tensile load of 1 kgf before being covered with rubber whereas its elongation reduces to about 0.2 per cent after having been covered with rubber. Further, the elongation at cord breakage was about 5 to 6 per cent before being covered with rubber, whereas it reduced to 3 to 4 per cent after having been covered with rubber. Such a drastic change in extensibility before and after covering the cord with rubber is observed in any kind of high-elongation cord. Thus the prior art high-elongation cord has not been used for applications in which there is required a high elongation under low tensile load even after having been covered with rubber.

It is believed that the extensibility of the cord decreases drastically after having been covered with rubber because the rubber fluidizes during vulcanization and penetrates into the cord, that is, between the adjacent strands. The rubber that has penetrated will harden after vulcanization, thus restraining the movement of strands or steel filaments under tensile load.

An object of the present invention is to provide a high-elongation cord which exhibits excellent extensibility under low tensile load even after having been covered with rubber.

FIG. 1 shows a $3 \times 5 \times d(A)$ cord 10 which is the first embodiment of the present invention. It is made by twisting five brass-plated steel filaments 1 into a strand 2 and twisting three such strands 2 into a cord 3. Monofilaments 4 of organic fiber are situated in three recesses formed between the adjacent strands 2 and twisted together at the same time when twisting the cord 3. Each monofilament 4 is in contact with both adjacent strands 2 to close the space therebetween.

Figure 2:
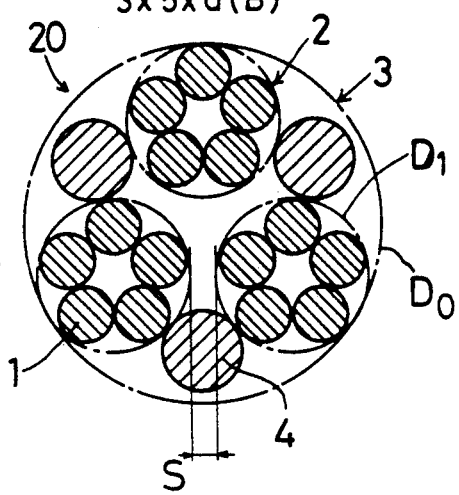

In FIGS. 1 and 2, $D_0$ designates the diameter of a circle circumscribing the cord 3, i.e. the diameter of the steel cord 3 and $D_1$ designates the diameter of each strand 2. The diameter $d_1$ of the monofilaments 4 of organic fiber and the distance S between the adjacent strands should preferably be limited to the following range for the reasons to be described later.

$$0.3h \leq d_1 \leq 0.5h \text{ and } 0 \leq S \leq 0.85d_1$$

$$h = \frac{2D_1 S + S^2 + \left( D_0 - (D_0 - D_1)\sin\frac{\pi}{2n}(n-2) \right)^2}{D_0 + D_1 - (D_0 - D_1)\sin\frac{\pi}{2n}(n-2)}$$

wherein:
- $d_1$: Diameter of monofilament
- S: Distance between the adjacent strands
- $D_0$: Diameter of steel cord
- $D_1$: Diameter of steel strand
- n: Number of steel strands The number of filaments 1 forming each strand 2 should be three or more to increase the roundness of the cross-sectional contour of the strand. The reason therefor will be described later.

If S is larger than $0.85 d_1$, the monofilament would be liable to enter into the center of the cord and have no effect of preventing rubber penetration.

FIG. 2 shows a $3 \times 5 \times d(B)$ cord 20 as the second embodiment of the present invention. While the cord 10 shown in FIG. 1 is formed from the strands 2 kept in contact with the adjacent ones, the cord 20 in FIG. 2 has its strands 2 arranged so as to be kept apart from the adjacent ones. Otherwise the cord 20 is the same in construction as the cord 10 in FIG. 1.

In order to minimize a decrease in low load extensibility of the cord after having been covered with rubber, it is necessary to prevent rubber penetration into the cord. For this purpose, the strands forming the cord and the filaments forming each strand have to be arranged so that no clearances are formed between the adjacent strands or between the adjacent filaments.

Figure 3:
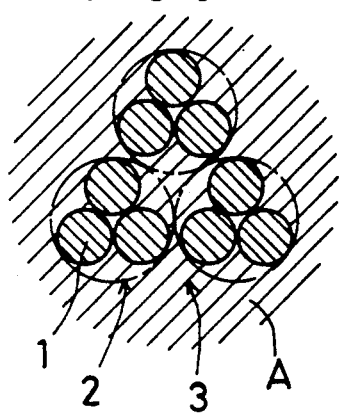

Rubber hardly penetrates into inside each strand because the steel filaments forming each strand are twisted in close contact with one another. But it is difficult to prevent the formation of gaps between the adjacent strands. FIG. 3 shows a $3 \times 3 \times d$ prior art cord by way of example. As is apparent from this figure, the gaps are especially large if each strand is composed of 2 to 4 filaments. This will allow rubber A to easily flow into a hollow center core of the cord. The size of such gaps can be reduced by increasing the number of filaments forming each strand because this increases the roundness of strand. By increasing the number of filaments per strand, the rubber will be less liable to flow into the core of the cord.

But it is impossible to increase the roundness only by arranging a large number of filaments in a single strands. Another conceivable method for forming a strand with such a large number of filaments is to arrange them in a plurality of concentric layers or circles and twist them together. But this method will lead to an increase in the number of production steps and in a decrease in the lay length. Thus there was no practical method for completely eliminating gaps between strands.

According to the present invention, a monofilament of organic fiber is arranged in each gap between the adjacent strands to close the gap and thus to prevent rubber from penetrating into the hollow center core of the cord.

Steel filaments are not preferable as materials for filling the gaps between strands because they tend to have a significant influence on the strength and extensibility of the cord. In contrast, monofilaments of organic fiber are extremely low in strength and high in extension compared with steel filaments. Thus they will scarcely influence the strength and extensibility of the cord.

We shall describe the reason for limiting the diameter $d_1$ of the monofilaments of organic fiber. They should be kept within the circumscribed circle $D_0$ shown in FIG. 1. If they have such a large diameter as to protrude out of this circle, they would abrade and sustain damage to its surface by the frictional contact with the guide rollers when twisted together with the steel strands. This will lead to a decrease in the bond properties with rubber or might even cause the breakage of monofilaments, thus allowing rubber to penetrate into the core space of the cord. For the above reasons, the monofilaments 4 of organic fiber should have a diameter $d_1$ which is large enough to be in contact with the adjacent strands and small enough not to protrude from the circumscribed circle $D_0$. The maximum value of $d_1$ ($d_1$ max) is attained when the monofilament is in touch with the circumscribed circle $D_0$. Therefore, the maximum permissible value of $d_1$ is given by the next equation.

$$d_{1max} = \frac{2D_1 S + S^2 + \left(D_0 - (D_0 - D_1)\sin\frac{\pi}{2n}(n-2)\right)^2}{2\left\{D_0 + D_1 - (D_0 - D_1)\sin\frac{\pi}{2n}(n-2)\right\}}$$

Since the value h is equal to $2d_1$ max, the maximum permissible value for the diameter $d_1$ is 0.5h.

So long as they fill the gaps between the strands without fail and prevent the monofilaments from getting broken, their diameter should be as large as possible. Thus the minimum permissible value of the diameter $d_1$ ($d_1$ min.) should be $0.6 \times d_1$ max., i.e. 0.3h.

In order to maintain the elongation properties of the cord, the monofilaments should be made of nylon or polyester.

The composite cord shown in FIG. 2 is also effective in preventing rubber from penetrating into the center space of the cord for the above-described reasons. The cord shown in FIG. 2 has an extensibility equal to or larger than that of the cord shown in FIG. 1 because the adjacent strands, which are kept apart from each other, can move toward each other, while compressing the monofilaments of organic fiber sandwiched therebetween.

Next, in order to make it easy to attain the high extensibility of this composite cord, raising up the twisting ratio was tried. The twisting ratio A is explained by the next equation.

$$A = \sqrt{\frac{(\pi D)^2 + P^2}{P}}$$

wherein
P: lay length of the strand (or cord)
D: diameter of the circle connecting the centers of the wires (or strands)
A1: twisting ratio of strand
B2: twisting ratio of strand As the result of this trial, it was found that the most suitable value of $A1 \times A2$, A1, A2 is as follows.

$$1.01 \leqq A1 \times A2 \leqq 1.27$$

$$1.006 \leqq A1 \leqq 1.129, \ 1.006 \leqq A2 \leqq 1.129$$

Figure 4:
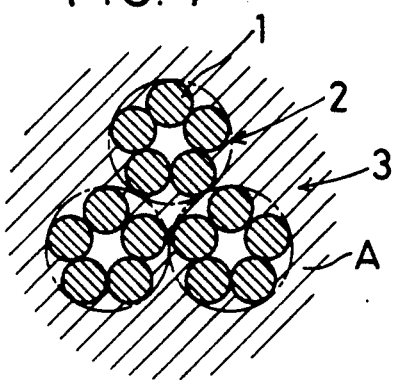
Figure 5:
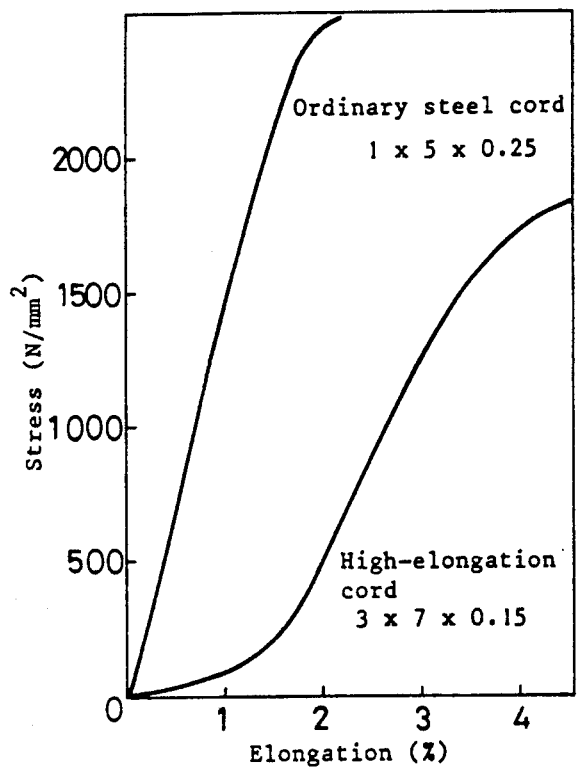
Figure 7:
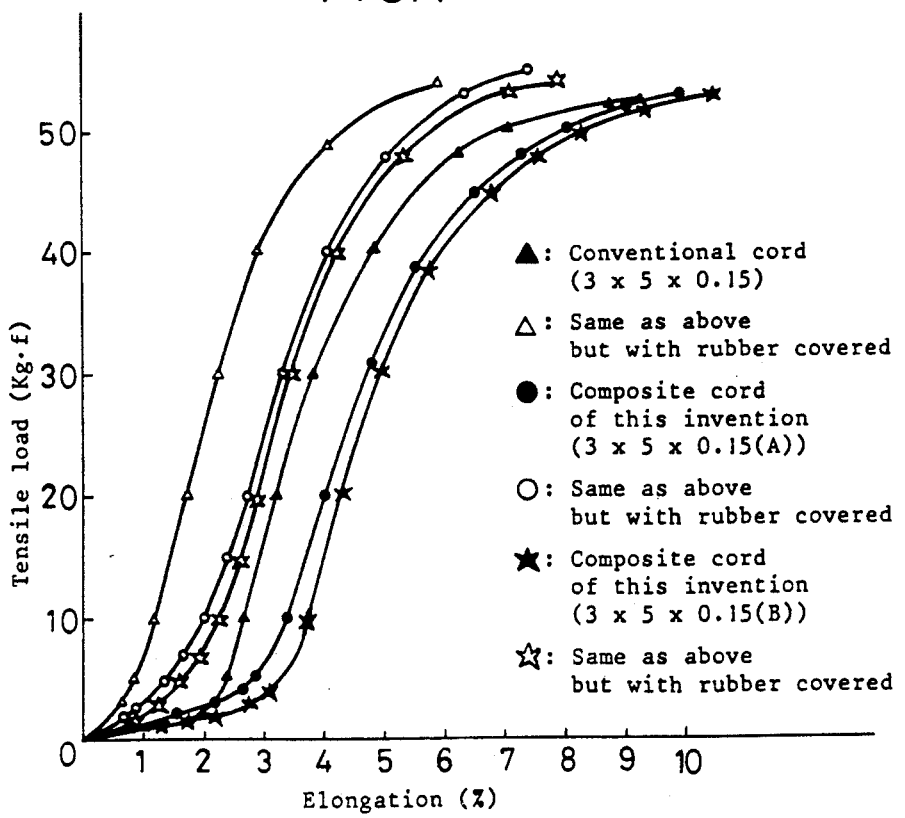

Other features and objects of the present invention will become apparent from the following description taken with reference to the accompanying drawings, in which: FIG. 1 is a sectional view of the first embodiment of the present invention; FIG. 2 is a similar view of the second embodiment of the present invention; FIGS. 3 and 4 are sectional views of prior art cords; FIG. 5 is a graph showing the elongation characteristics of an ordinary steel cord and a high-elongation cord;

FIG. 6 is a graph showing change in the extensibility of a 3×3×0.15 (lay length 1.7S/3.5S) prior art high-elongation cord before and after covering rubber; and FIG. 7 is a graph showing the difference between elongations before and after covering rubber, measured for the cords according to the present invention and the prior art cords.

EMBODIMENT 1

Three strands including five brass-plated steel filaments having a diameter of 0.15 milimeter were twisted together with three monofilaments of organic fiber having a diameter of 0.18 millimeter. In this composite cord, three monofilaments were disposed in between the adjacent strands. A composite cord 10 having a sectional shape as shown in FIG. 1 was obtained. (Example (3) in Table 1) Similarly, a 3×3×0.15 (A), 2×5×0.15 (A) are the composite cords twisted with monofilaments. (Examples (1), (2) in Table 1)

As a material for the monofilaments, polyester or nylon was used. In order to improve their adhesion to rubber, the monofilaments were subjected to an R.F.L. (resorcinol, formalin and latex) surface treatment.

The cords thus made were put to a tensile test to check their characteristics. The results are shown as a 3×5×0.15 (A) in FIG. 7.

The results clearly show that the cords according to the present invention exhibit sufficiently high elongations under low load after having been covered with rubber, compared with 3×5×0.15 prior art high-elongation cords.

In this case, covered rubber has the following mechanical properties, for instance, 30–70 kgf/mm$_2$ at 100% modulus.

Although the cords used for this test have the same lay length (2.0S/3.5S), the cords according to the present invention have a diameter slightly larger than the 3×5×0.15 cord (which means that the gaps between the adjacent strands are slightly larger than 3×5×0.15 cord) because of wedging of the monofilaments between the adjacent strands. As a result, their elongation before being covered with rubber is larger than with the conventional one (3×5 ×0.15 cord) because of the increase in diameter.

EMBODIMENT 2

Three strands including five brass-plated steel filaments having a diameter of 0.15 millimeter and having the adjacent strands disposed so as to be kept apart from each other were twisted together with monofilaments of organic fiber having a diameter of 0.22 millimeter. This composite cord 20 has a sectional shape as shown in FIG. 2 (Example (6) in Table I). Similarly, a 3×3×0.15 (B), 2×5×0.15(B) are the composite cords twisted with monofilaments. (Examples (4), (5) in Table 1)

For comparison purposes, conventional high-elongation cords 1 to 14 in Table 1 were also prepared which do not meet the requirements of the present invention. They were evaluated for the appearance and performance. The results are also shown in Table 1. In this table, the holding ratio of extensibility for each cord is described, and the high holding ratio of extensibility is appeared for the invented each cord.

TABLE 1

Twisting construction of high-elongation composite cord

| | Steel cord Strand × filament | Lay length (mm) Steel cord | Monofilament | Twisting ratio ($A_1 \times A_2$) | Diameter of monofilament ($d_1$) Allowable range | Working diameter |
|---|---|---|---|---|---|---|
| Comparative example (1) | 3 × 3 × 0.15 | 1.7 S/3.5 S | — | 1.050 × 1.055 = 1.11 | — | — |
| Comparative example (2) | 2 × 5 × 0.15 | 2.0 S/3.5 S | — | 1.078 × 1.064 = 1.15 | — | — |
| Comparative example (3) | 3 × 5 × 0.15 | 2.0 S/3.5 S | — | 1.078 × 1.085 = 1.17 | — | — |
| Comparative example (4) | 3 × 5 × 0.12 | 2.0 S/3.5 S | — | 1.050 × 1.055 = 1.11 | — | — |
| Example (1) | 3 × 3 × 0.15(A) | 1.7 S/3.5 S | 3.5 S | 1.050 × 1.055 = 1.11 | 0.094–0.156 | 0.15 |
| Example (2) | 2 × 5 × 0.15(A) | 2.0 S/3.5 S | 3.5 S | 1.078 × 1.064 = 1.15 | 0.162–0.270 | 0.25 |
| Example (3) | 3 × 5 × 0.15(A) | 2.0 S/3.5 S | 3.5 S | 1.078 × 1.085 = 1.17 | 0.117–0.196 | 0.18 |
| Example (4) | 3 × 3 × 0.15(B) | 2.0 S/3.5 S | 3.5 S | 1.050 × 1.066 = 1.12 | 0.137–0.228 | 0.20 |
| Example (5) | 2 × 5 × 0.15(B) | 2.0 S/3.5 S | 3.5 S | 1.078 × 1.160 = 1.25 | 0.228–0.379 | 0.32 |
| Example (6) | 3 × 5 × 0.15(B) | 2.0 S/3.5 S | 3.5 S | 1.078 × 1.099 = 1.18 | 0.169–0.281 | 0.22 |

TABLE 2

Evaluation of high-elongation composite cord

| | Elongation (%) at 5 kgf load Before covering with rubber(M) | Elongation (%) at 5 kgf load After covering with rubber(N) | Holding ratio of extensibility $\left( = \frac{N}{M} \right)$** |
|---|---|---|---|
| Comparative example (1) | 1.69 | 0.81 | 100 |
| Comparative example (2) | 1.58 | 0.84 | 104 |
| Comparative example (3) | 2.33 | 0.78 | 96 |
| Comparative example (4) | 1.67 | 0.85 | 105 |
| Example (1) | 2.20 | 1.22 | 151 |
| Example (2) | 2.36 | 1.37 | 169 |
| Example (3) | 2.76 | 1.30 | 160 |
| Example (4) | 2.74 | 1.48 | 183 |
| Example (5) | 2.86 | 1.63 | 201 |
| Example (6) | 3.04 | 1.55 | 191 |

*Rubber covered: 30–70 kg/cm² at 100% modulus
**Calculated with the ratio of comparative example (1) as basis

What is claimed is:

1. A high-elongation composite steel cord for reinforcing a rubber product, said steel cord comprising (1) a plurality of strands each made by twisting a plurality of brass-plated steel filaments, and (2) a plurality of organic monofilaments which have been subjected to a resorcinolformaline-latex surface treatment, said organic monofilaments being arranged between and in contact with adjacent strands, said strands and said monofilaments being twisted together to form a twisted strand with a hollow core in its center, the diameter dl of said each organic monofilament and the distance S between the adjacent strands being given by the formula:

$$0.3h \leq dl \leq 0.5h \text{ and } 0 \leq S \leq 0.85 dl$$

wherein $$h = \frac{2D_1 S + S^2 + \left( D_0 - (D_0 - D_1)\sin \frac{\pi}{2n} (n-2) \right)^2}{D_0 + D_1 - (D_0 - D_1)\sin \frac{\pi}{2n} (n-2)}$$

wherein $D_0$ designates the diameter of the steel cord, $D_1$ designates the diameter of each steel strand, n designates the number of steel strands, and S designates the distance between the adjacent strands.

2. A high-elongation composite steel cord as claimed in claim 1, wherein said strands are in contact with each other when twisting them together with said monofilaments arranged between and in contact with them.

3. A high-elongation composite steel cord as claimed in claim 1, wherein said strands are apart from each other when twisting them together with said monofilaments arranged between and in contact with them.

4. A high-elongation composite steel cord as claimed in claims 2, 3 or 1 wherein said each cord has the following relation give by:

$$1.01 \leq A1 \times A2 \leq 1.27$$

$$1.006 \leq A1 \leq 1.129, \ 1.006 \leq A2 \leq 1.129$$

wherein
A1 : twisting ratio of strand
A2 : twisting ratio of cord
and the twisting ratio A is given by:

$$A = \sqrt{\frac{(\pi D)^2 + P^2}{P}}$$

P : lay length of the strand (or cord)
D : diameter of the circle connecting the centers of the wires or strands.

* * * * *